(12) United States Patent
Reynes et al.

(10) Patent No.: US 9,694,559 B2
(45) Date of Patent: Jul. 4, 2017

(54) COVER PLATE FOR AIRCRAFT DOOR

(71) Applicant: Airbus Operations (SAS), Toulouse (FR)

(72) Inventors: Didier Reynes, Toulouse (FR); Christophe Casse, Fenouillet (FR)

(73) Assignee: Airbus Operations SAS, Toulouse (FR)

( * ) Notice: Subject to any disclaimer, the term of this patent is extended or adjusted under 35 U.S.C. 154(b) by 234 days.

(21) Appl. No.: 14/626,093

(22) Filed: Feb. 19, 2015

(65) Prior Publication Data
US 2015/0231856 A1 Aug. 20, 2015

(30) Foreign Application Priority Data
Feb. 19, 2014 (FR) ...................................... 14 51309

(51) Int. Cl.
*B32B 7/02* (2006.01)
*B32B 15/08* (2006.01)
*B32B 15/20* (2006.01)
*B64C 1/14* (2006.01)

(52) U.S. Cl.
CPC ............... *B32B 7/02* (2013.01); *B32B 15/08* (2013.01); *B32B 15/20* (2013.01); *B64C 1/143* (2013.01); *B64C 1/1407* (2013.01); *B32B 2262/101* (2013.01); *B32B 2262/106* (2013.01); *B32B 2307/30* (2013.01); *B32B 2605/18* (2013.01); *Y10T 428/24942* (2015.01)

(58) Field of Classification Search
CPC B32B 7/02; B32B 15/20; B32B 15/08; B32B 2262/101; B32B 2262/106; B32B 2605/18; Y10T 428/24942; B64C 1/14–1/1492
See application file for complete search history.

(56) References Cited

U.S. PATENT DOCUMENTS

2008/0093504 A1    4/2008  Lamat et al.
2011/0052910 A1*   3/2011  Gunnink ................. B32B 15/14
                                                       428/337
2013/0105630 A1    5/2013  Klaas et al.

FOREIGN PATENT DOCUMENTS

EP    2586699    5/2013
GB    2169865    7/1986

OTHER PUBLICATIONS

French Search Report, Oct. 20, 2014.

* cited by examiner

*Primary Examiner* — Prashant J Khatri
(74) *Attorney, Agent, or Firm* — Greer, Burns & Crain, Ltd.

(57) ABSTRACT

A cover plate, to cover part of a space between a door and a door surround, comprising at least one pressure element secured to at least part of the external face of the cover plate. The pressure element comprises two sheets, an external sheet and an internal sheet, these two sheets being superposed and fixed together. The internal and external sheets are respectively made from materials that have different thermal expansion properties causing at least a contraction of the internal sheet with respect to the external sheet, at least for a range of temperatures comprised between −20° C. and −50° C.

6 Claims, 3 Drawing Sheets

COVER PLATE FOR AIRCRAFT DOOR

CROSS-REFERENCES TO RELATED APPLICATIONS

This application claims the benefit of the French patent application No. 1451309 filed on Feb. 19, 2014, the entire disclosures of which are incorporated herein by way of reference.

FIELD OF THE INVENTION

The present invention relates to a cover plate for an aircraft door.

BACKGROUND OF THE INVENTION

It is known that above the door of an aircraft, notably a transport airplane, there is generally a cover plate which is arranged on the external face in order to close off a space between the door and the door surround mounted on the fuselage of the aircraft, this space being allocated to the movement of the door as the latter is opened or closed. This cover plate notably has the function of preventing the door from becoming jammed with ice or snow, and of improving aerodynamics.

Because the stiffness of this cover plate, and therefore the pressure with which this cover plate presses against the fuselage, has a direct effect on the force required to open and close the door, cover plates that are flexible are generally provided in order to make movements of the door easier.

However, a flexible cover plate carries, at a leading edge, a risk of vibration caused by the air flow. This phenomenon may cause the space between the door and its surround to open up and/or may generate noise during a flight.

SUMMARY OF THE INVENTION

The present invention relates to a cover plate that allows this disadvantage to be overcome.

To this end, according to an aspect of the invention, the cover plate, which has an external face facing toward the outside and an internal face that is the opposite of said external face, is notable in that it comprises at least one pressure element secured to at least part of the external face of the cover plate, said pressure element comprising two sheets, an external sheet and an internal sheet, these being superposed and fixed together, the internal and external sheets being respectively made from materials that have different thermal expansion properties causing at least a contraction of the internal sheet with respect to the external sheet, at least for a range of temperatures comprised between −20° C. and −50° C.

Thus, by virtue of the difference in thermal expansion properties between the two sheets of the pressure element, and of the fact that this difference causes at least the internal sheet to contract with respect to the external sheet at least for the aforementioned range of temperatures, the pressure element is curved toward the inside for this range of temperatures, and thus applies pressure to the cover plate. This range of temperatures notably corresponds to temperatures at which ice and/or snow may appear on the aircraft. This pressure allows the cover plate to be held pressed against the door surround, thus preventing the space between the door and the surround from opening up, thereby making it possible to overcome the aforementioned disadvantage.

The cover plate may have at least some of the following features, considered individually or in combination:
- the external sheet is made of glass fiber reinforced plastic (GFRP), and the internal sheet is made of aluminum;
- the external sheet is made of carbon fiber reinforced plastic (CFRP), and the internal sheet is made of aluminum;
- the pressure element is arranged at least on a leading edge of the cover plate.

In a first embodiment, the cover plate may have one or more pressure elements covering said cover plate to a greater or lesser extent. Furthermore, in a second embodiment, it comprises just one pressure element which completely covers said cover plate.

The present invention also relates to an aircraft, particularly a transport airplane, which comprises at least one door, the door being associated with a cover plate like the above-mentioned.

BRIEF DESCRIPTION OF THE DRAWINGS

The attached figures will make it easy to understand how the invention may be embodied. In these figures, identical references denote elements that are similar.

DETAILED DESCRIPTION OF THE PREFERRED EMBODIMENTS

Figure 1:
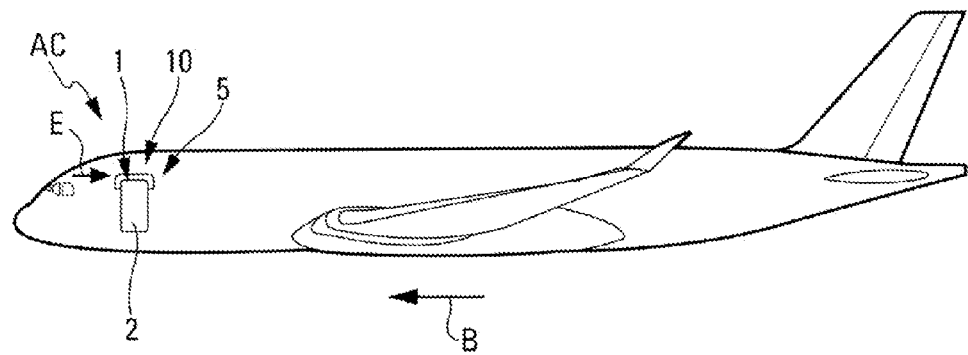
FIG. 1 schematically depicts an airplane to which the invention is applied.

The cover plate 1 illustrating the invention is intended to cover part of a door 2 of an aircraft AC, for example a transport airplane, as depicted in FIG. 1.

More particularly, such a cover plate 1 is arranged over the top of the door 2 at the level of the upper edge 12 thereof, on the external face 2A of the door 2, with a view to stopping off or closing off a space 3 (FIG. 3) that exists between the door 2 and the surround 4 of the door 2. The surround 4 forms part of the fuselage 5 of the aircraft AC. This top clearance space 3 is allocated to the movement of the door 2 during opening or closing. This is because the door 2 has to be raised in order to unlock it. The cover plate 1 has the notable role of preventing the door 2 from becoming jammed with ice or snow and of improving aerodynamics.

In one particular embodiment, this cover plate 1 comprises at least one core 11, made for example of a metal/fiberglass/resin composite with an internal coating of silicone.

Figure 3:
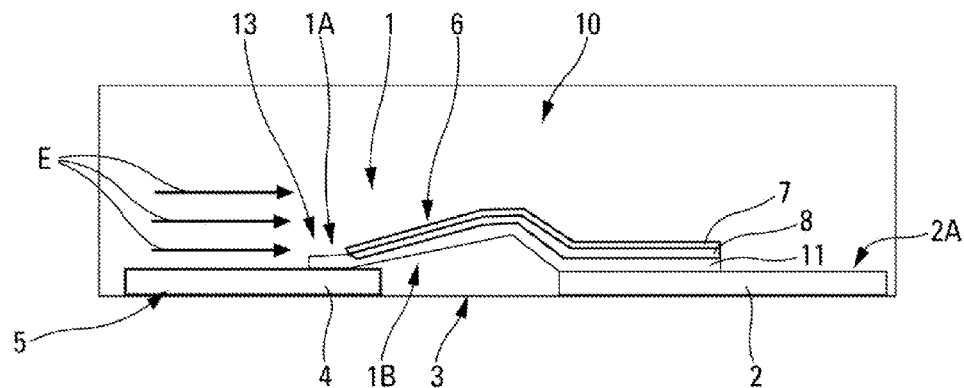
FIG. 3 is a view in section, on A-A of FIG. 2, showing an enlargement of a space between a door and a door surround.

This core 1 has an external face 1A directed and situated toward the outside of the aircraft AC, and an internal face 1B that is the opposite of the external face 1A and is situated and directed toward the inside of the aircraft AC, when the door 2 is in the closed position 2 (FIG. 3).

The door 2, the surround 4 and the cover plate 1 form an assembly 10 referred to as the door assembly.

In the context of the present invention, the terms "internal" and "external" are defined for positions respectively situated toward the inside and toward the outside of the aircraft AC.

According to one embodiment of the invention, the cover plate 1 comprises at least one pressure element 6 secured (for example by bonding) to at least part of the external face 1A of the cover plate 1.

Figure 4:
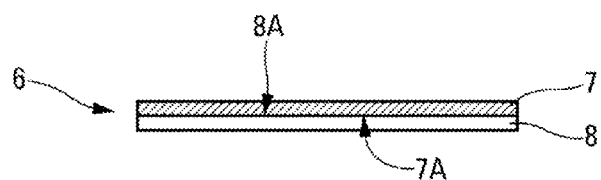
FIGS. 4 and 5 are two schematic views in longitudinal section of a pressure element, respectively subjected to different temperatures.
Figure 5:

This pressure element 6 comprises two sheets 7 and 8, as depicted in FIGS. 3 to 5, namely an external sheet 7 and an internal sheet 8. These sheets 7 and 8 are superposed and fixed together, as specified hereinbelow.

The sheets 7 and 8 are respectively made from materials that have different thermal expansion properties, which cause at least the internal sheet 8 to contract with respect to the external sheet 7 for a range of temperatures that relate to a cruising flight of the aircraft AC.

Thus, by virtue of the difference in thermal expansion properties between the two sheets 7 and 8 of the pressure element 6 and of the fact that this difference causes at least the internal sheet 8 to contract with respect to the external sheet 7 for a range of temperatures relating to cruising flight, notably between −20° C. and −50° C., the pressure element 6 is curved toward the inside for this range of temperatures, and thus applies pressure to the cover plate 1. This range of temperatures notably corresponds to temperatures for which ice and/or snow may appear on the aircraft AC.

Figure 2:
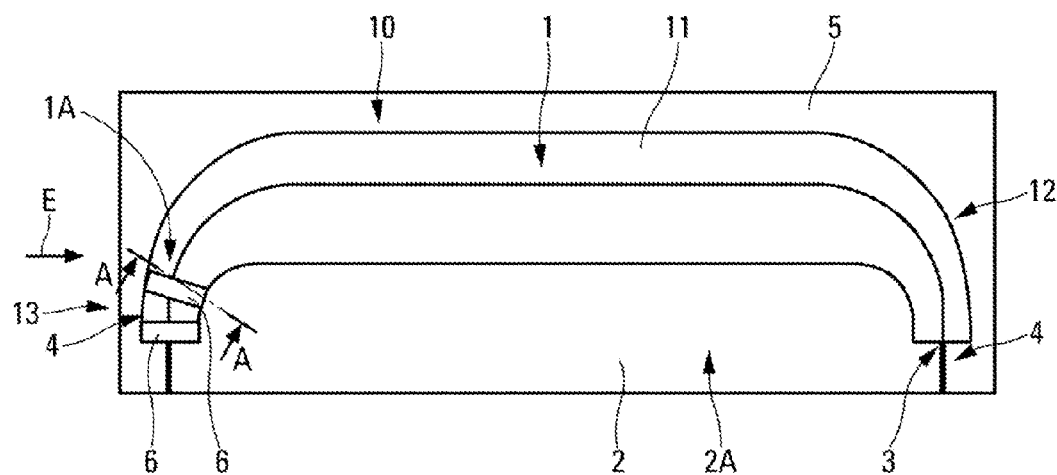
FIG. 2 schematically depicts part of a door assembly comprising pressure elements.

This pressure allows the core 11 to be held against the surround 4 of the door 2, making it possible to prevent the onset of vibration generated by the air flow (the direction of flow of which at the upper edge 12 of the door 2 is illustrated by one or more arrows E in FIGS. 1 to 3 in particular) when the aircraft AC is in flight (in a direction illustrated by an arrow B in FIG. 1), and notably makes it possible to prevent a space 3 from opening up between the door 2 and its surround 4.

Figure 6:
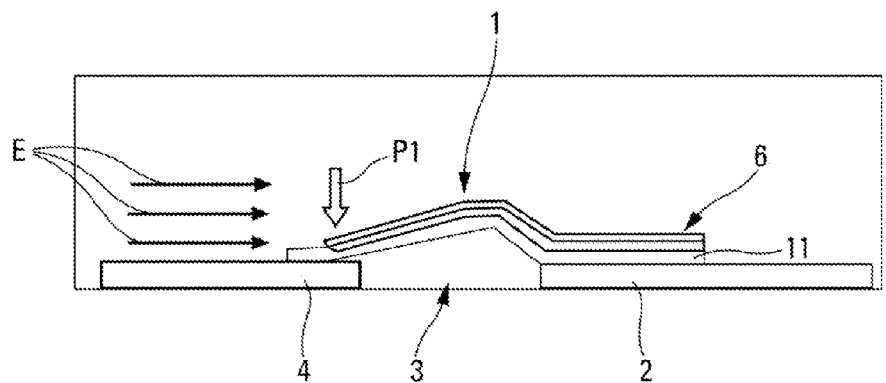
FIGS. 6 and 7 are views in section similar to the view of FIG. 3, for situations relating to different external temperatures, respectively, and FIG. 8 schematically depicts in longitudinal section one embodiment of a cover plate and pressure element assembly.

FIG. 6 illustrates a situation in which the aircraft AC is at a cruising flight temperature, for example −20° C. and −50° C. In this situation, because of the thermal contraction of the internal sheet 8 with respect to the external sheet 7 such that the pressure element 6 adopts for example the shape in FIG. 5, namely a convexly (viewed from the outside) curved shape, a high pressure is generated by the pressure element 6 pressing the cover plate 1 against the surround 4, as illustrated by an arrow P1 in FIG. 6. This situation creates good resistance to the effects of the air flow and notably makes it possible to prevent the cover plate 2 from uncovering the space 3, even partially.

By contrast, for temperatures, for example between 10° C. and 30° C., likely to be encountered at an airport, the difference in thermal expansion properties of the two sheets 7 and 8 is such that it generates a thermal extension of the internal sheet 8 with respect to the external sheet 7 so that the pressure element 6 applies a lower pressure.

Figure 7:
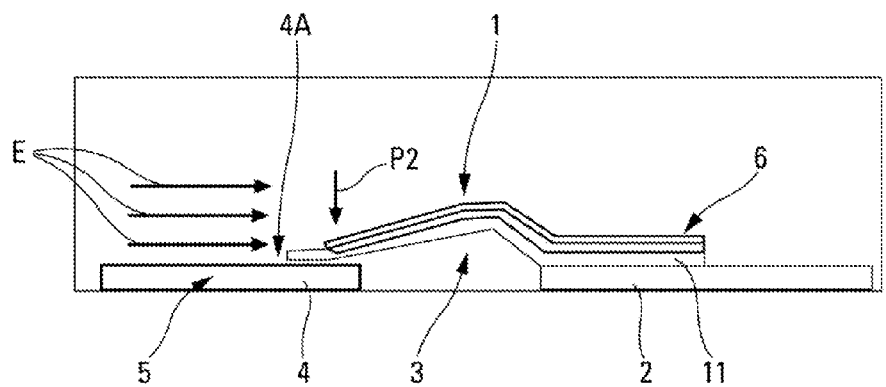

FIG. 7 illustrates a situation in which the aircraft AC is at an ambient temperature on the ground, particularly the temperature at an airport or in a hangar, for example of the order of 20° C. In this situation, because of the thermal extension of the internal sheet 8 with respect to the external sheet 7, such that the pressure element 6 for example adopts the shape of FIG. 4, a low pressure is generated by the pressure element 6 pressing the cover plate 1 against the surround 4, as illustrated by an arrow P2 in FIG. 7. This situation notably favors the opening of the door 2.

In the context of the present invention, the external sheet 7 and the internal sheet 8, which have substantially the same shape and the same surface area, may be fixed together in various ways, respectively via the internal face 7A of the external sheet 7 and the external face 8A of the internal sheet 8 (FIG. 4). For preference, they are fixed together over the entirety of their face in common.

In a first embodiment, the sheets 7 and 8 are welded together. Further, in a second embodiment the sheets 7 and 8 are bonded together, for example using an epoxy adhesive.

Moreover, said sheets 7 and 8 may be made of different materials.

In particular, in a first embodiment, the external sheet 7 is made of a glass fiber reinforced plastic (GFRP), and the internal sheet 8 is made of aluminum.

Furthermore, in a second embodiment, the external sheet 7 is made of a carbon fiber reinforced plastic (CFRP) and the internal sheet 8 is made of aluminum.

In the context of the present invention, various embodiments of the pressure element 6 pressing on the cover plate 1 may also be envisioned.

In a first embodiment, there are one or more pressure elements 6, for example of rectangular shape, of small size, as depicted in FIG. 2. For preference, these pressure elements 6 are arranged at least along a leading edge 13 of the cover plate 1, namely against the side of the door 2 where the air flow (illustrated by the arrows E in FIGS. 2 and 3) carries the risk of lifting the cover plate 1 and causing it to vibrate.

In a second embodiment, a larger pressure element 6 may be provided, covering the entirety of one side of the cover plate 1, preferably likewise the side (edge 13) where the air flow carries the risk of lifting the cover plate 1 and causing it to vibrate.

Furthermore, in a third embodiment, the cover plate 1 is provided with a single pressure element 6 which covers the entirety of the external face 1A of the cover plate 1.

Figure 8:
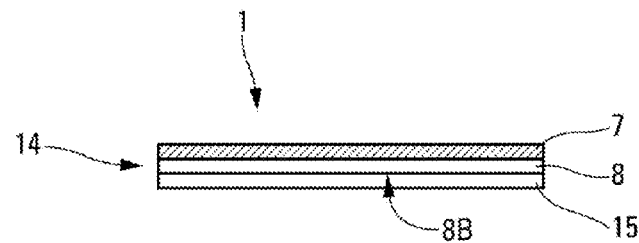

What is more, in another embodiment depicted in FIG. 8, an assembly 14 constituting the cover plate 1 and the pressure element 6 comprises the two sheets 7 and 8 as well as, on an internal face 8B of the internal sheet 8, a protective layer 15 made of a material that has a low coefficient of friction. The cover plate 1 is thus made of the two sheets 7 and 8 and additionally comprises a material with a low coefficient of friction, notably an elastomer such as silicone, between the internal sheet 8 and the contact or bearing surface 4A (FIG. 7) on the fuselage 5, so as not to damage this contact or bearing surface.

Furthermore, in one particular embodiment (not depicted), it is possible to envision at least one pressure element on the cover plate elsewhere than on the leading edge, if there is a desire for a cover plate which does not touch the fuselage at positive temperatures (in order, in such a case, to minimize the effort required on a handle for opening the door 2) and which presses against the fuselage and closes the space only at temperatures at which snow and ice may stop off the top clearance space (space 3) needed for lifting the door 2 in order to unlock it.

The cover plate 1 and the pressure element or elements 6 may be made of different materials able to perform the following functions: protect the top space 3 if need be (risk of snow and/or ice), withstand the aerodynamic effects of the air flow without sustaining damage, and cause minimum friction for the opening of the door 2.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A cover plate for an aircraft door of an aircraft, the cover plate comprising:
   a generally U-shaped core extending at least partially along a top edge of the aircraft door, said core also extending along at least a portion of a leading edge of the door and generally perpendicularly to a direction of airflow;
   an external face of said core facing outwardly toward an outside of the aircraft;
   an internal face of said core that is opposite of said external face and abutting the aircraft door when said core is viewed in cross-section;
   at least one pressure element secured to said core at said external face of said core of the cover plate, said pressure element also being superposed over at least part of the aircraft door when said core is viewed in cross-section;
      said pressure element comprising two sheets, an external sheet and an internal sheet;
      said internal and external sheets being superposed and fixed together;
      said internal and external sheets being respectively made from materials that have different thermal expansion properties causing at least a contraction of the internal sheet with respect to the external sheet, at least for a range of temperatures comprised between −20° C. and −50° C.

2. The cover plate of claim 1, wherein said external sheet is made of glass fiber reinforced plastic and said internal sheet is made of aluminum.

3. The cover plate of claim 1, wherein said external sheet is made of carbon fiber reinforced plastic and said internal sheet is made of aluminum.

4. The cover plate of claim 1, wherein said pressure element is arranged at least on a leading edge of the cover plate.

5. The cover plate of claim 1, wherein said pressure element completely covers said cover plate.

6. An aircraft comprising a door assembly having at least one aircraft door and a cover plate, the cover plate comprising:
   a generally U-shaped core extending at least partially along a top edge of the aircraft door, said core also extending along at least a portion of a leading edge of the door and extending generally perpendicularly to a direction of airflow;
   an external face of said core facing outwardly toward an outside of the aircraft;
   an internal face of said core that is opposite of said external face and abutting the aircraft door when said core is viewed in cross-section;
   at least one pressure element secured to said core at said external face of said core of the cover plate, said pressure element also being superposed over at least part of the aircraft door when said core is viewed in cross-section;
      said pressure element comprising two sheets, an external sheet and an internal sheet;
      said internal and external sheets being superposed and fixed together;
      said internal and external sheets being respectively made from materials that have different thermal expansion properties causing at least a contraction of the internal sheet with respect to the external sheet, at least for a range of temperatures comprised between −20° C. and −50° C.

* * * * *